(12) United States Patent
Tanijiri et al.

(10) Patent No.: US 8,174,569 B2
(45) Date of Patent: May 8, 2012

(54) IMAGE DISPLAY APPARATUS

(75) Inventors: Yasushi Tanijiri, Osakasayama (JP); Sei Mitsui, Suita (JP); Hiroshi Yamaguchi, Suita (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1390 days.

(21) Appl. No.: 11/804,456

(22) Filed: May 18, 2007

(65) Prior Publication Data
US 2007/0291966 A1    Dec. 20, 2007

(30) Foreign Application Priority Data

May 26, 2006  (JP) ................................. 2006-146353

(51) Int. Cl.
| H04N 7/00 | (2006.01) |
| H04N 7/18 | (2006.01) |
| H04R 25/00 | (2006.01) |
| G02C 5/20 | (2006.01) |

(52) U.S. Cl. ........ 348/115; 381/309; 381/379; 381/380; 351/123

(58) Field of Classification Search ................... 348/115
See application file for complete search history.

(56) References Cited

U.S. PATENT DOCUMENTS

| 4,955,708 | A | * | 9/1990 | Kahaney ........................... 351/44 |
| 5,606,743 | A | * | 2/1997 | Vogt et al. ...................... 455/347 |
| 5,812,224 | A |   | 9/1998 | Maeda et al. ................... 349/13 |
| 5,880,773 | A |   | 3/1999 | Suzuki ........................... 348/115 |
| 6,175,576 | B1 | * | 1/2001 | Boakye et al. ................. 370/524 |
| 6,176,576 | B1 | * | 1/2001 | Green et al. ................... 351/123 |
| 6,680,802 | B1 | * | 1/2004 | Ichikawa et al. .............. 359/630 |
| 6,690,807 | B1 | * | 2/2004 | Meyer ............................. 381/327 |
| 7,104,646 | B2 | * | 9/2006 | Yang .............................. 351/120 |
| 7,246,901 | B2 | * | 7/2007 | Curci et al. .................... 351/118 |
| 7,461,936 | B2 | * | 12/2008 | Jannard ......................... 351/158 |
| 2002/0190923 | A1 | * | 12/2002 | Ronzani et al. ................. 345/50 |
| 2006/0017657 | A1 | * | 1/2006 | Yamasaki .......................... 345/8 |

FOREIGN PATENT DOCUMENTS

| JP | 5-183838 A | 7/1993 |
| JP | 07-236102 A | 9/1995 |
| JP | 09-504120 A | 4/1997 |
| JP | 9-130705 A | 5/1997 |
| JP | 11-271667 A | 10/1999 |
| JP | 2002-515127 A | 5/2002 |
| WO | WO 95/11473 A1 | 4/1995 |
| WO | WO 96/07947 A1 | 3/1996 |

OTHER PUBLICATIONS

Japanese Notice of Reasons for Refusal dated May 10, 2011, for counterpart Japanese Application No. 2006-146353, together with an English translation thereof.

* cited by examiner

*Primary Examiner* — John B. Walsh
(74) *Attorney, Agent, or Firm* — Cozen O'Connor

(57) ABSTRACT

An image display apparatus, which is mounted on a head or face of a wearer attachably and detachably and allows the wearer to view an image and hear sound, includes a long formed temple supported by a temporal region of head or an ear when the wearer is wearing the image display apparatus; a speaker that generates sound, a sound generating face thereof being insertable into the ear at a vicinity of an opening of the ear; and a position adjusting mechanism that holds the speaker, attachably to and detachably from the temple, and movably at least substantially along a surface of the temporal region of the head.

12 Claims, 5 Drawing Sheets

IMAGE DISPLAY APPARATUS

This application claims priority on Japanese Patent Application No. 2006-146353 filed on May 26, 2006 in the Japanese Patent Office, the entire content of which is hereby incorporated by reference.

FIELD OF THE INVENTION

In present invention relates to an image display apparatus, and particularly relates to a head mount type image display apparatus that allows viewing an image and listening sound.

BACKGROUND OF THE INVENTION

In recent years, there have been developed head mount type image display apparatuses, namely HMDs (Head Mount Display), for the purposes of appreciation of content images such as movies and video, and remote operation of industrial devices or medical devices, and the like.

A HMD is mounted on the head or face of an observer attachably and detachably, and directly projects an image onto an eye of the observer by an eyepiece optical system, the image obtained from an image display device such as a liquid crystal display device and inorganic EL, thereby achieving observation of a virtual image as if the obtained image ware enlarged and projected in the air.

A HMD in such a structure supply a wearer with images, and usually includes a speaker (ear phone) to supply sound also.

Herein, realistic sensation of sound is important so that a wearer is immersed in the world of images. However the shape and size, and the relative position relationship between the head and ears are different depending on each wearer. Accordingly, it is necessary that the position of a speaker is adjustable to an optical position so that the wearer can appreciate realistic sound without sound leakage. In this situation, various mechanisms have been studied so that the position of a speaker can be adjusted, depending on the position of an ear of a wearer.

For example, a technology for a glasses type image display apparatus (refer to Patent Document 1: Japanese Patent Application Publication TOKKAI No. H5-183838) is disclosed that integrates ear hook sections and the respective earphones, and position-adjustably fits them on a cover in a glasses form so as to adjust the positions of the ear hook sections and the positions of earphones simultaneously. Disclosed is a technology (refer to Patent Document 2: Japanese Patent Application Publication TOKKAI No. H9-130705) of a head mount type image display apparatus that supports the main body of an image display apparatus on the head of an observer, and moves support members provided with speakers corresponding to the shape of the head, thereby adjusting the positions of the speakers. Further, disclosed is a technology (refer to Patent Document 3: Japanese Patent Application Publication TOKKAI No. H11-271667) of a visual apparatus provided with earphones that are connected with the main body of the apparatus via cables and can be housed in the main body of the apparatus, wherein the earphones are pulled out from the main body and are directly inserted in the ears of a wearer for appreciation of sound.

However, the technology disclosed in Patent Document 1 does not allow pulling out the earphones from the main body of the apparatus to directly insert them into ears. Consequently, it is not possible to clearly hear sound in a noisy environment. Further, it causes problems of losing secrecy due to sound leakage and irritating others with discomfort.

Further, it is understood that it is difficult to surely locate earphones at the positions of ears, the positions of ears being different depending on wearers. Still further, since the earphones cannot be attached to nor detached from the main body of the apparatus, it is understood that it is difficult to make the apparatus in a compact size so as to be put away. In the technology disclosed by patent Document 2, since moving the speakers changes the head holding shape, it is understood that it is difficult to surely locate the earphones at the positions of ears, wherein the positions of ears are different depending on wearers. Further, this may cause sound leakage, and accordingly secrecy may be lost. According to the technology disclosed by Patent Document 3, since the apparatus is not provided with a position adjustment mechanism for earphones, it is always necessary to pull out the earphones from the main body of the apparatus and insert them into ears in order to appreciate sound, and is it also necessary to simultaneously take off the earphones from the ears in order to take off the apparatus from the head. Thus, the operability greatly decreases.

In this situation, an object of the present invention is to provide an image display apparatus, which is mounted on a head or face attachably and detachably and allows viewing of images and hearing sound, that is always supported on the head in a stable state without being affected by the variation of the shape of the head and the position of the ear of a wearer, inhibits leakage of sound, and supplies extremely realistic sound, eliminating the complication and high price of the apparatus.

SUMMARY OF THE INVENTION

The invention includes the following structures to attain objects, such as described above.

In an aspect of the invention, there is provided an image display apparatus that is mounted on a head or face of a wearer attachably and detachably and allows the wearer to view an image and hear sound, including:

a long formed temple supported by a temporal region of head or an ear when the wearer is wearing the image display apparatus;

a speaker that generates sound, a sound generating face thereof being insertable into the ear at a vicinity of an opening of the ear; and a position adjusting mechanism that holds the speaker, attachably to and detachably from the temple, and movably at least substantially along a surface of the temporal region of the head.

In another aspect of the invention, there is provided an image display apparatus that is mounted on a head or face of a wearer attachably and detachably and allows the wearer to view an image and hear sound, including:

a long formed temple that is supported by a temporal region of head or an ear when the wearer is wearing the image display apparatus, wherein a recession is formed on a side face of the temple opposite to a side face in contact with the temporal region of the head;

a speaker that generates sound; and a ball-hinge that supports the speaker, wherein the ball-hinge is supported by the recession movably along the recession.

In still another aspect of the invention, there is provided an image display apparatus that is mounted on a head or face of a wearer attachably and detachably and allows the wearer to view an image and hear sound, including:

a first temple in a long form supported by a temporal region of head or an ear when the wearer is wearing the image display apparatus;

a second temple in a long form supported by the first temple movably along a longitudinal direction of the first temple, and a speaker that generates sound and is supported by the second temple, wherein the first temple supports the second temple movably along the temporal region of head.

DETAILED DESCRIPTION OF THE PREFERRED EMBODIMENTS

Figure 1:
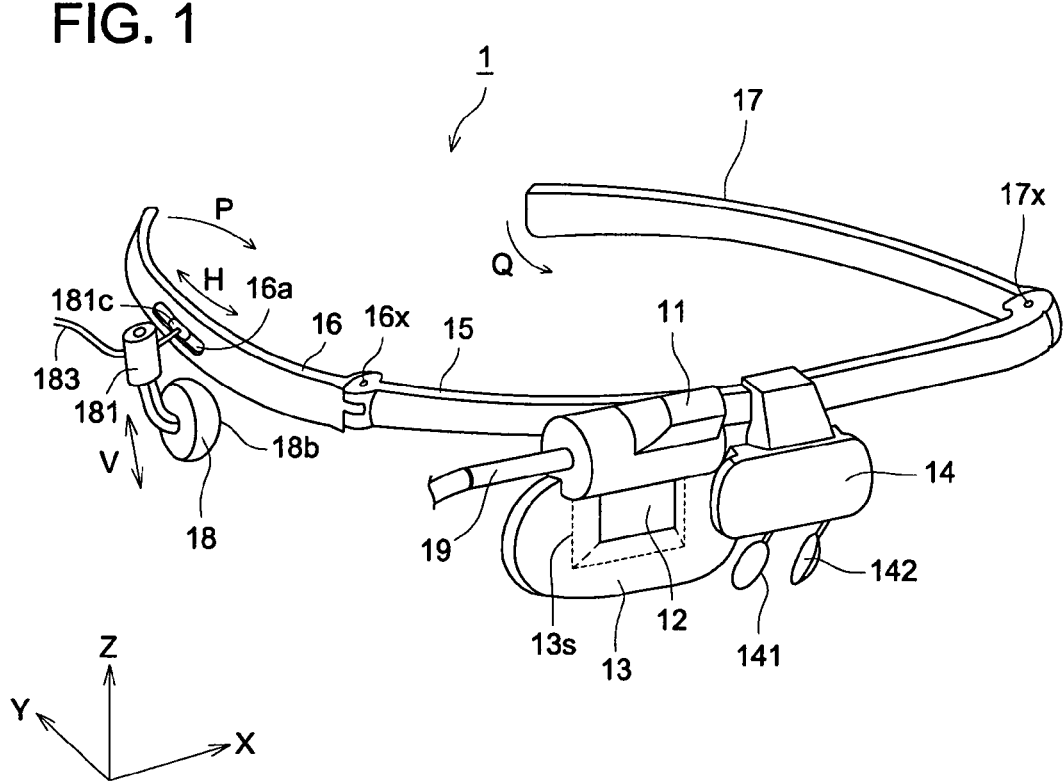
FIG. 1 is a schematic external view of a HMD in Embodiment 1 in accordance with the invention.

HMDs (Head Mount Displays), which are a part of typical embodiments of image display apparatuses in accordance with the invention, will be described below, referring to the drawings.

[Embodiment 1]

First, the external view of a HMD 1 in Embodiment 1 will be described, referring to FIG. 1. FIG. 1 is a perspective view of the HMD 1 in accordance with the invention, viewed from the left oblique front.

The HMD 1 is a head mount type image display apparatus, which is arranged adjacent to an eye of a wearer to be used. The HM 1 is provided, as shown, with a LCD display section 11, eyepiece optical system 12, transparent substrate 13, bridge 14, frame 15, temples 16 and 17, speaker (earphone) 18, speaker support member 181, and the like. The HMD 1 takes in a content image, video or television for example, and sound from an external I/F, not shown, displays the taken-in image on the LCD display section 11, and guides the displayed image to the eye of the wearer via the eyepiece optical system 12. Further, the HMD 1 guides the taken-in sound to the ear of the wearer via the speaker 18.

The bridge 14 is provided with nose pads 141 and 142 that hold the HMD 1 on the face of the wearer, and is jointed with the frame 15 and transparent substrate 13.

The temples 16 and 17 are long formed members constructed of an elastic material having flexibility or the like, and are arranged on the right and left of the frame 15 in a pair. The temples 16 and 17 are hung on the temporal regions of head or ears to hold the HMD 1 on the head of the wearer and adjust the wearing position for the wearer. Herein, the temples 16 and 17 are allowed to rotate in arrowed directions P and Q at rotation sections 16x and 17x. When the HMD 1 is not used, the temples 16 and 17 are rotated toward the direction of the frame 15 to become along the transparent substrate 13 for compactization. Further a recession 16a is formed on the side face of the temple 16 along the longitudinal direction of the temple 16, and a ball-hinge 181c provided on the speaker support member 181 is engaged with the recession 16a.

A speaker 18 is supported by a speaker support member 181, movably in arrowed direction V (Z-axis direction) and attachably and detachably.

The speaker support member 181 is provided with the ball-hinge 181c and supported to be movable through the ball-hinge 181c in the arrow direction H (Y-axis direction) along a recession 16a formed on the temple 16, due to restriction by the recession 16a.

Since, as described above, the speaker support member 181 is supported to be movable through the ball-hinge 181c in the arrow direction H (Y-axis direction) along the recession 16a due to restriction by the recession 16a, the speaker support member 181 can be moved rotationally around X-axis, Y-axis, Z-axis in FIG. 1 and translated in the direction of Y-axis (direction arrow H). Accordingly, with translation in Y-axis direction and rotation around X-axis, the speaker 18 can be moved to be aligned with the position of the ear of the wearer, substantially along the surface of the temporal region of head (relatively perpendicularly to the direction of X-axis). Further, the speaker 18 is rotated around Y-axis and Z-axis so that the direction of a sound generating surface 18b of the speaker 18 is adjusted to make the sound generating surface 18b faces the opening of the ear. In such a manner, sound can be securely guided to the ear, which realizes appreciation of extremely realistic sound. Thus, the recession 16a, ball-hinge 181c, and speaker support member 181 function as a position adjusting mechanism of the HMD in the present embodiment.

Figure 2:
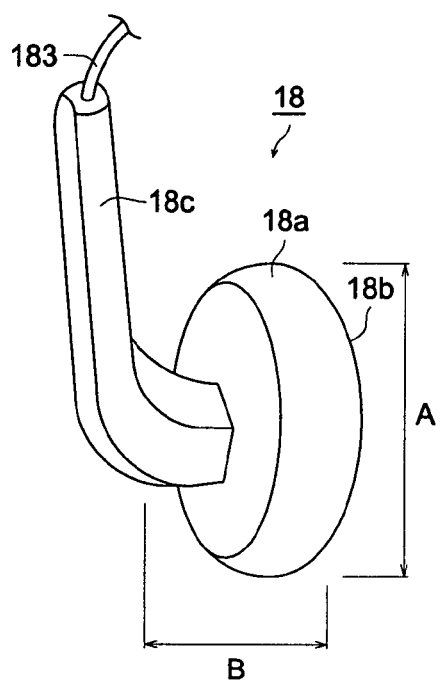
FIG. 2 is a schematic external view of a speaker (earphone) of the HMD in Embodiment 1.

Now, the external view of the speaker 18 will be described, referring to FIG. 2. FIG. 2 is a schematic diagram showing the external view of the speaker 18.

As shown in FIG. 2, the speaker 18 is provided with a sound generating section 18a, grip section 18c, etc. The diameter A of the sound generating surface 18b arranged on the sound generating section 18a is 15 mm, and the distance B between the sound generating surface 18b and the grip section c is 10 mm. The side surface of the sound generating section 18a is formed in a barreled tube shape. Accordingly, the wearer cam adjust the position of the speaker to the position of the ear, making it possible to easily insert the sound generating section 18a into the ear, at a vicinity of the opening of the ear. Further, the sound generating section 18a is securely held by the peripheral edge of the opening of the ear.

Further, the speaker 18 is supported attachably and detachably to and from the speaker support member 181, and there is nothing, between the sound generating surface 18b and the grip section 18c (distance B), that inhibits insertion of the sound generating section 18a into the ear. Accordingly, the sound generating section 18a can be securely inserted into the ear at the vicinity of the opening of the ear. Thus, it is possible to clearly hear sound even in a noisy environment and inhibit leakage of sound.

Figure 3:
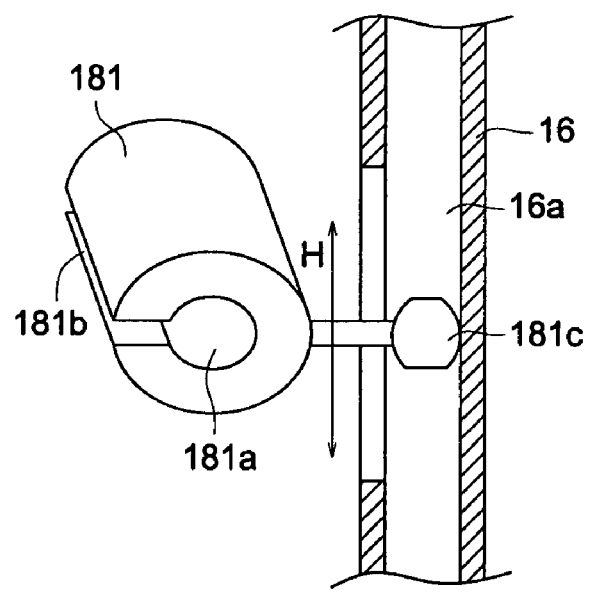
FIG. 3 is a schematic external view of a speaker support member of the HMD in Embodiment 1.

Now, the external view of the speaker support member 181 will be described, referring to FIG. 3. FIG. 3 is a schematic diagram showing an external view of the speaker support member 181 and a fragmental plane cross-sectional view of the temple 16. As shown in FIG. 3, the speaker support member 181 is formed in a cylindrical shape. At the end faces of the cylindrical shape, a long hole 181a is formed to make the speaker 18 movable in arrow direction V in FIG. 1 and to support the speaker 18 attachable and detachable. At the side surface of the speaker support member 181, a gap 181b is formed along the longitudinal direction to let a speaker code 183 pass the gap, wherein the speaker code 183 electrically connects the speaker 18. Thus, the speaker code 183a does not get tangled, allowing easy attaching and detaching of the speaker 18.

As described above, since the speaker support member 181 is provided with the ball-hinge 181c and supported to be movable in the arrow direction H along the recession 16a through the ball-hinge 181c due to restriction by the recession 16a formed on the temple 16, the speaker support member 181 can be moved rotationally around X-axis, Y-axis, Z-axis and translated in the direction of Y-axis (direction arrow H).

Figure 4:
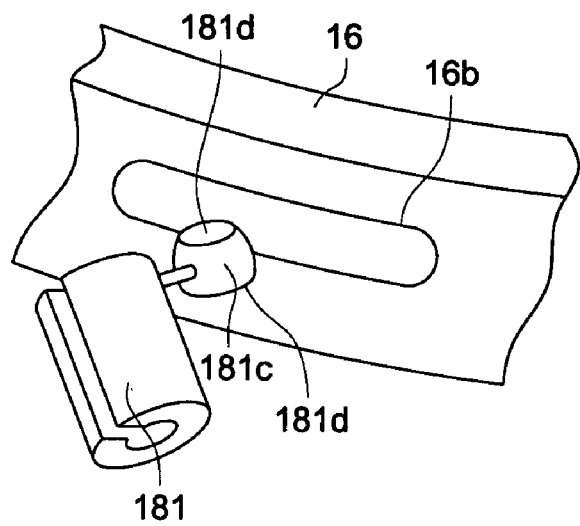
FIG. 4 is a schematic view showing a joint structure between the speaker support member and a temple of the HMD in Embodiment 1.

Now, attaching and detaching of the speaker support member 181 will be described, referring to FIG. 4. FIG. 4 is a schematic diagram showing a method of attaching and detaching the speaker support member 181 to and from the temple 16.

As shown in FIG. 4, the ball hinge 181c of the speaker support member 181 is formed with a pair of cut portions 181d, which are parallel to each other. These cut portions 181d are put to the opening section 16b of the temple 16 along the longitudinal direction so that the speaker support member 181 is attachable to and detachable from the temple 16. Further, when the wearer uses the speaker 18 having the speaker support member 181 engaged with the temple 16, the direction of the cut portions 181d is deviated from the longitudinal direction of the opening section 16b to a large extent so that the speaker support member 181 is prevented from coming off easily during usage. Such a structure allows easy assembling and reduction in cost. Further, when the HMD 1 is to be used without the speaker 18, the weight of the HMD 1 can be decreased by taking the speaker support member 181 off. Still further, when the HMD 1 is not used, the HMD 1 can be made compact to be put away, by taking the speaker support member 181 off.

Further, the speaker is formed such as to have a shape with a diameter in a range from 5 mm to 15 mm, in the region from the sound generating surface to the position 5 mm away, at shortest, toward the direction perpendicular and opposite to the sound generating surface. With this arrangement, the sound generating surface can be inserted into the ear at the vicinity of the opening of the ear, and supported stably by the ear. This inhibits leakage of sounds.

Still further, since the speaker has a grip section, it is easy to wear the speaker at the ear. Yet further, as the grip section is arranged to be at least 5 mm away from the sound generating surface toward the side opposite to the ear when the sound generating surface is inserted into the ear at a vicinity of the opening of the ear, it is possible to insert the speaker securely without interference between the grip section and the temporal region of head.

Referring back to FIG. 1, a transparent substrate 13 is a transparent body which is substantially in a flat shape which is formed with a space 13s in a U-shape and located at a position corresponding to the right eye in the present embodiment. An eyepiece optical system 12, described later, is inserted in the space 13s in U-shape, which is surrounded by the transparent substrate 13.

A LCD display section 11 generates images, based on content image signals for video or television for example, which are taken in from an I/F not shown.

The eyepiece optical system 12 guides images generated by the LCD display section 11 to the eye of the wearer.

Figure 5:
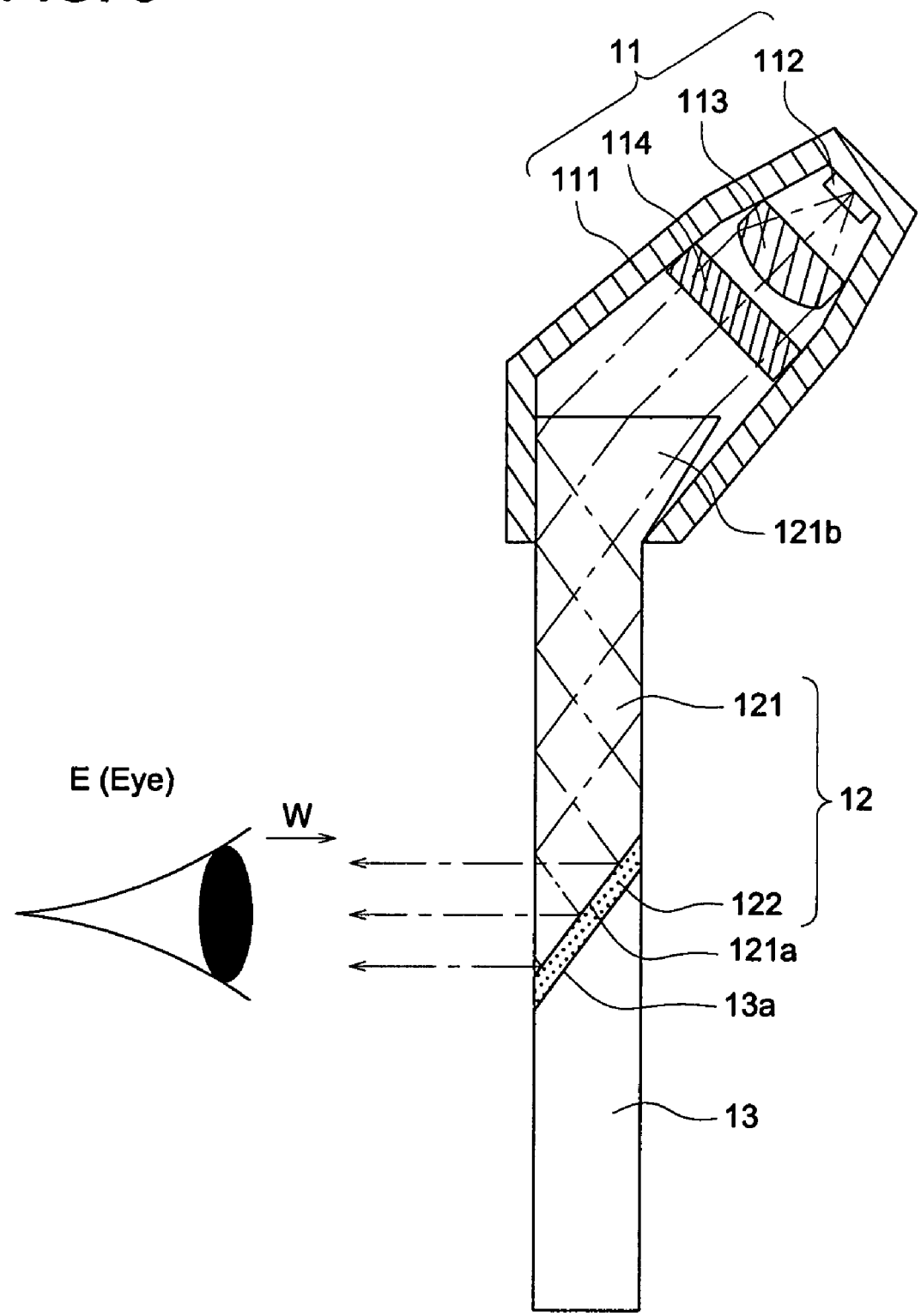
FIG. 5 is a side cross-sectional view showing a structure of a LCD display section and eyepiece optical system of the HMD in Embodiment 1.

Herein, the structures of the LCD display section 11 and eyepiece optical system 12 will be described, referring to FIG. 5. FIG. 5 is a side cross-sectional view of the LCD display section 11 and eyepiece optical system 12, the HMD1 being viewed from the left side with respect to the front side in FIG. 1, and mainly shows respective inner structures.

As shown in FIG. 5, the LCD display section 11 includes a housing 111, LED (Light Emitting Diode) 112, collimator lens 113, LCD (Liquid Crystal Display) 114, and the like. The eyepiece optical system 12 includes a prism 121, HOE (Holographic Optical Element) 122 and the like.

Inside the housing 111 of the LCD display section 11, there are fitted the LED 112, collimator lens 113 and LCD 114 in a built-in state, wherein the housing 111 protrudes obliquely upward toward the front side (obliquely right-upward in FIG. 5) from the top end of the prism 121 of the eyepiece optical system 12.

The LED 112 is a point light source having a LED integrated for RGB including colors of three wavelengths of R (red light), G (green light), and B (blue light).

The collimator lens 113 makes lights from the LED 112 into parallel lights and projects them onto the LCD 114.

The LCD 114 generates an image, based on a signal of content image, for video and television for example, which is taken in from an external I/F, not shown. The LCD 114 is a transparent type liquid crystal display panel, for example.

The prism 121 is a transparent member having a substantially plate shape structured of glass or transparent resin. The prism 121 is designed to internally reflect a light beam from the LCD 114 plural times. The upper end portion of the prism 121 is formed with a thick section 121b in a wedge-shape such as to be thick toward the upper side and to stick out toward the front side (opposite to the eyepiece surface) so that almost all light beams from the LCD 114 can be guided inside the prism 121.

A slant surface 121a is formed at the lower end of the prism 121. The prism 121 is joined (for example, adhered) to the slant surface 13a formed on the transparent substrate 13 through the HOE 122. Each of the front surface and the back surface of the prism 121 forms a single surface continuous with the front or back surface of the transparent substrate 13. Thus, the prism 121 is integrated with the transparent substrate 13 into a single plate shape.

The HOE 122 is a volume phase type hologram optical element having positive power and formed with an optically axial asymmetric free curved surface. The HOE 122 is supported with a predetermined slant angle at the lower end of the prism 121. The HOE 122 provides the eye E with a hologram image by using optical interference phenomenon caused by irradiation of the light beams guided through the prism 121.

In the LCD display section 11 and eyepiece optical system 12 having the structure described above, the light beams emitted from the LED 112 pass through the collimator lens 113 and irradiate the LCD 114. The image-light-beam generated in the LCD 114 by this irradiation is totally reflected plural times in the prism 121, then diffracted by the HOE 122 and guided to the eye E of the wearer of the HMD 1 as a virtual image.

Further, the prism 121 is designed to guide the light beams inputted from the front side to the eye E of the wearer of the HMD 1. Based on the structure described above, since the wearer of the HMD 1 can see the outside sight (the subject in front) through the prism 121 (see-through), the wearer of the HMD 1 can view the image taken in externally, superimposed on the outside sight (the subject in front).

The slant surface 13a formed on the transparent substrate 13 cancels the refraction of the light beams on the slant surface 121a of the prism 121. Namely, since the prism effect on the slant surface 121a prevents the light beams from the arrow sign W side from reflecting upward, a wearer of the HMD 1 can observe the outside lights without distortion through the prism 121, the transparent substrate 13 and HOE 122.

The integrated RGB LED 112 with central wavelengths of 465 nm, 520 nm and 635 nm is used for image light, and the HOE 122 is a hologram of a volume phase type that diffracts image lights of wavelengths of 465±10 nm, 520±10 nm and 635±10 nm. Herein, the HOE 122 only diffracts lights of specific wavelengths of specific incidence angles, and accordingly affects little on outside light. Therefore, outside light passes the prism 121, transparent substrate 13 and HOE 122, allowing the wearer to observe the outside scene normally.

The HMD 1 is structured such that image light is reflected inside the prism 121 and guided to the eye E. Thus, the prism 121 can be formed as thin (for example, about 3 mm) as common glass lenses, achieving a small size and lightweight of the HMD 1. Further, since the HMD has a structure such that reflection of light in the prism 121 is total reflection, the wearer can observe an outside scene through the front and back sides of the prism 121, without a drop in the transmitting rate of outside light. Further, although the transparent substrate 13 is formed in a flat shape, a correcting glass lens with a curvature may also be used.

Still further, although the eyepiece optical system 12 is structured such that an outside scene can be observed, being superimposed on an image, the eyepiece optical system 12 may also be structured such that an outside scene corresponding to an image display area can be observed only around the image display area, as necessary, by partially covering the outside scene with a liquid crystal shutter, for example. Yet further, it is also possible to cover the outside scene both in the image display area and around it so that the wearer can be immersed in the image.

Yet further, although in the present embodiment, a speaker is provided corresponding to a single ear, speakers may be provided corresponding to the right and left ears so as to make stereophonic sound. Further, display units constituted with a LCD display section and eyepiece optical system may be provided corresponding to the both eyes.

As has been described, an image display apparatus in accordance with the invention is provided with a small and light display unit that allows observation of outer scenes and a small and light audio output unit. Accordingly, the wearer can wear an image display apparatus comfortably while confirming the safety around the wearer, and observe an image while clearly hearing sound without making others feel uncomfortable.

[Embodiment 2]

Figure 6:
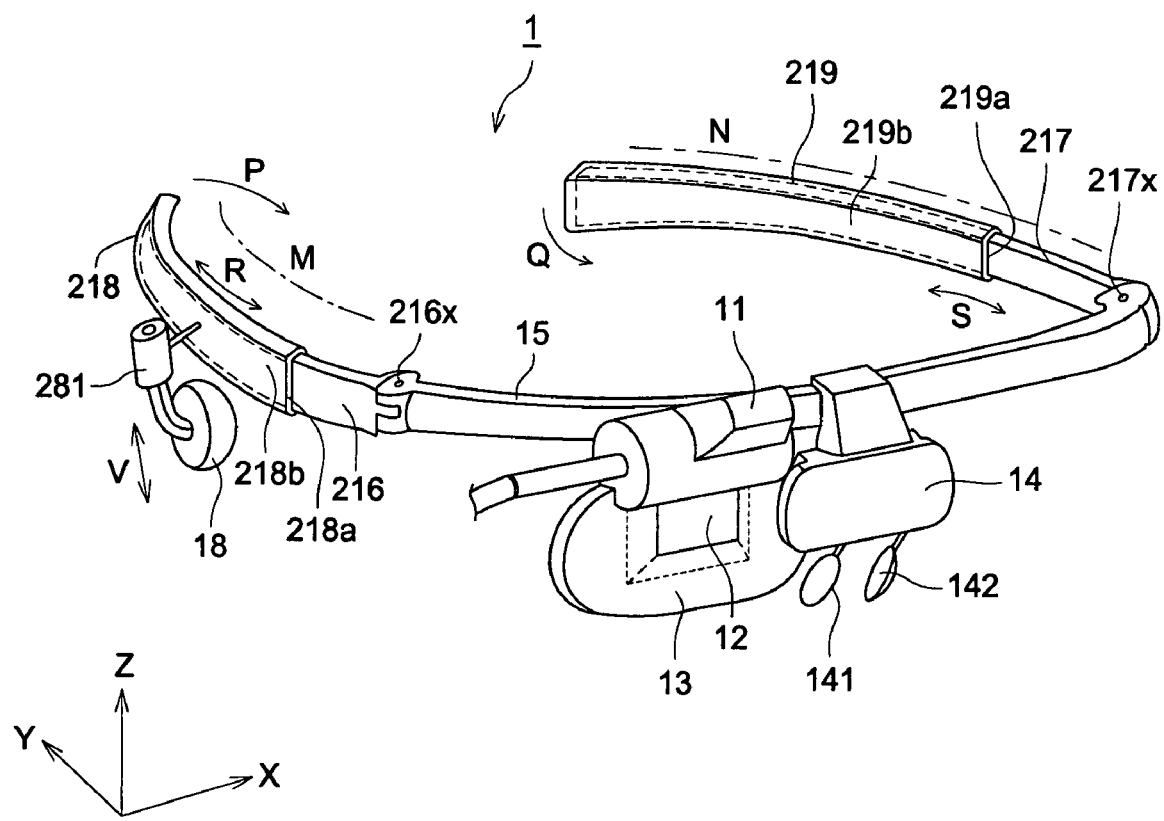
FIG. 6 is a schematic external view of a HMD in Embodiment 2 in accordance with the invention.

Now, a HMD 1 in a second embodiment will be described. As the main structure is almost the same as in Embodiment 1, described above, detailed descriptions will be omitted, and temples and a speaker support member having different structures from those in Embodiment 1 will be described, referring to FIG. 6. FIG. 6 is a perspective view of the HMD 1 in accordance with the present embodiment, viewed from the left oblique front.

The temple in Embodiment 2 is constituted with first temples 216 and 217 and second temples 218 and 219, as shown in FIG. 6.

The first temples 216, 217 and second temples 218, 219 are long-shaped members constructed of an elastic material having flexibility or the like, and are arranged on the right and left of the frame 15 in pairs. The temples are hung on the temporal regions of head or ears to hold the HMD 1 on the head of the wearer and adjust the wearing position for the wearer. Herein, the first temples 216 and 217 are allowed to rotate in arrowed directions P and Q at rotation sections 216x and 217x. When the HMD 1 is not used, the first temples 216, 217 and second temples 218, 219 are rotated toward the direction of the frame 15 to become along the transparent substrate 13 for compactization.

Further, the respective one end faces of the second temples 218 and 219 are provided with openings 218a and 219a, and long holes 218b and 219b are formed from the openings 218a and 219a toward the back sides of the second temples 218 and 219. The rear ends of the first temples 216 and 217 are inserted in the long holes 218b and 219b, and the second temples 218 and 219 are supported by the first temples 216 and 217, movably along arrow directions R and S. The first temples 216, 217 and second temples 218, 219 are formed in arc shapes along the temporal regions of head, as shown with alternate long and short dash lines M and N.

A speaker support member 281 supports a speaker 18, movably along arrow direction V, and attachably and detachably.

The speaker support member 281 is in accordance with the invention, and is supported attachably and detachably to and from a side face of the second temple 218.

In such a manner, the speaker 18 is supported by the speaker support member 281 movably in Z-axis direction (arrow V direction), and the second temple 218 supporting the speaker support member 281 is supported by the first temple 216 movably in Y-axis direction (arrow R direction). Accordingly, it is possible to move the speaker 18 substantially along the surface of the temporal region of head (relatively perpendicularly to the direction of X-axis) to the position of the ear of the wearer. Further, the second temple 218 is supported by the first temple 216 movably along the temporal region of head. Consequently, the shape along the temporal region of head does not change even when the second temple 218 is moved, and thus, it is always possible to securely hold the HMD 1 on the head.

There have been described embodiments in accordance with the invention. However, it should be understood that the invention is not limited thereto, and of course, modification and change may be made, as necessary.

Figure 7:
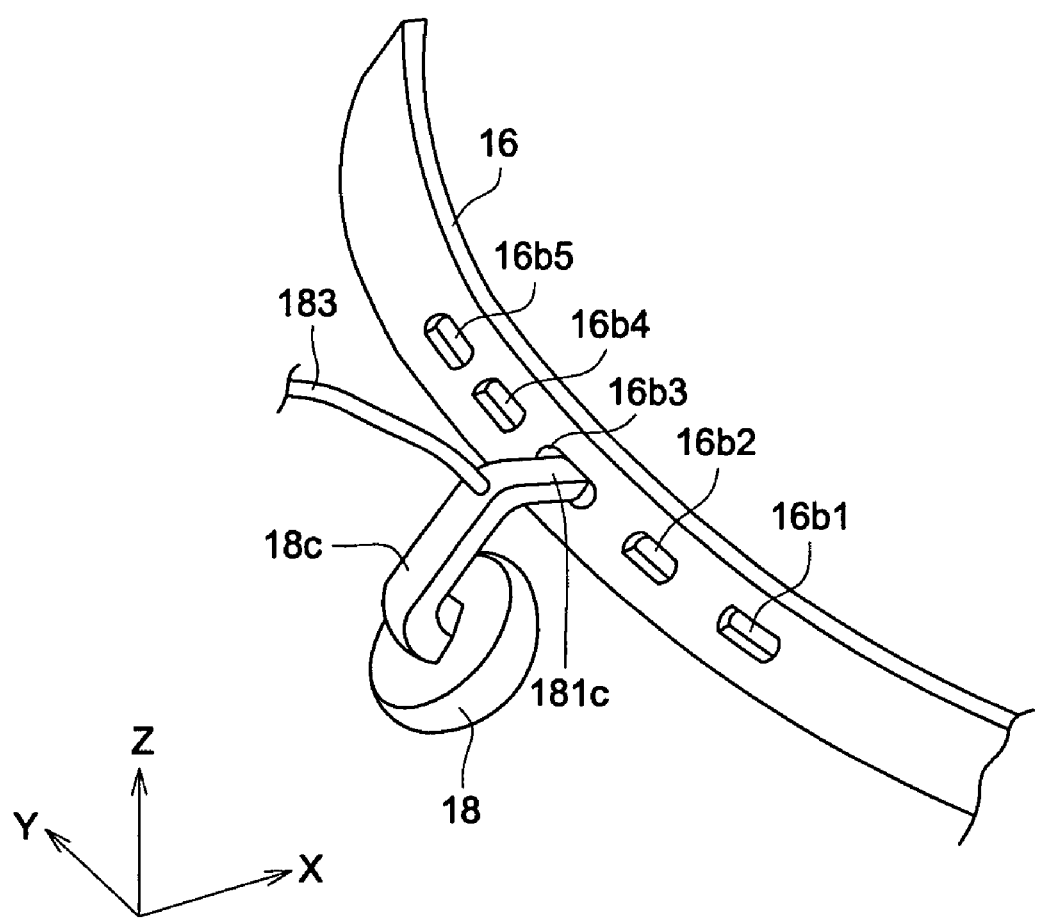
FIG. 7 is a schematic view showing a joint structure of a speaker and temple in another example in Embodiment 1.

For example, although it was described that the HMD 1 in Embodiment 1 is arranged such that the ball-hinge 181c provided at the speaker support member 181 is engaged with the recession 16a formed on a side face of the temple 16 along the longitudinal direction so that the speaker support member 181 is movable in Y-axis direction, it is also possible to provide, for example, five recessions 16b1 to 16b5 on the side face of the temple 16 along the longitudinal direction, as shown in FIG. 7, so that the grip section 18c of the speaker 18 can be directly supported by one of the recessions 16b1 to 16b5 without the speaker support member 181. The grip section 18c of the speaker 18 has a ball-hinge 181c with a partial cut, same as in Embodiment 1, and is engaged with one of the recessions 16b1 to 16b5. Therefore, the speaker 18 is rotatable around the three axes, namely X-axis, Y-axis and Z-axis. Further, by making the angle of the cut sections 181d along the longitudinal direction of the recessions 16b1 to 16b5, the speaker 18 can be taken off.

Further, by changing the position of a recession to insert the ball-hinge 181c of the speaker 18, the speaker 18 can be translated along Y-axis to be adjusted to the position of the ear of the wearer. Still further, it is also possible to take the speaker 18 off a recession, and insert it into the ear. Thus, the range of adjustment can be expanded with a simple structure, and also an excellent mechanical strength can be achieved because a long recession is not necessary.

In accordance with the invention, a position adjusting mechanism supports a speaker movably at least substantially along the surface of a temporal region of head. Accordingly, without being affected by the variation of the shape and size of the head and the position of the ear among wearers, the position of a speaker can be adjusted to the position of the ear of a wearer. Thus, it is possible to surely guide sound to the ear and appreciate realistic sound. Further, the speaker is arranged such that the sound generating face of the speaker is insertable into the ear at the vicinity of the opening, and the position adjusting mechanism supports the speaker attachably and detachably. Therefore, in a case where it is difficult to clearly hear sound in a noisy environment or in a case where secrecy could be lost and others could be irritated with discomfort due to sound leakage, these problems can be avoided by taking the speaker off the apparatus and inserting it into the ear. Still further, the apparatus can be made compact to be put away, by taking the speaker off the apparatus.

Further, the recession formed on the side face of a temple opposite to the side face in contact with the temporal region of head supports the speaker movably along the recession through a ball-hinge. Accordingly, the speaker can be rotated with respect to perpendicular three axes (X, y and z axes) with the rotation center at the position where the ball-hinge is engaged with the recession, and can be translated along the recession, in the longitudinal direction of the temple for example. In such a manner, the position of the earphone can be surely adjusted to the position of the ear, which is variable among individual wearers. Further, the ball-hinge is arranged to be supported attachably to and detachably from the recession. Accordingly, the apparatus can be made compact to be put away, by taking the ball-hinge off the recession.

Further, a speaker is arranged such as to be supported by a second temple that is movable in the longitudinal direction of a first temple. Accordingly, by moving the second temple, the position of the speaker can be adjusted in the front and back direction of the temporal region of head. Still further, the second temple is supported by the first temple movably along the temporal region of head. In such a manner, even when the second temple is moved, the shape along the temporal region of head does not change, and the second temple can always hold the head securely. Still further, the speaker is supported by the second temple through a support member that supports the speaker movably in the upper and lower direction of the temporal region of head. Therefore, the speaker is also movable substantially along the surface of the temporal region of head. Thus, the position of the earphone can be surely adjusted to the position of the ear which is variable among individual wearers. Yet further, the support member is supported attachably to and detachably from the second temple. Accordingly, the apparatus can be made compact to be put away, by taking the support member off the second temple.

What is claimed is:

1. An image display apparatus that is mounted on a head or face of a wearer attachably and detachably and allows the wearer to view an image and hear sound, comprising:
    a long formed temple supported by a temporal region of head or an ear when the wearer is wearing the image display apparatus, wherein the temple includes a recession;
    a speaker that generates sound, a sound generating face thereof being insertable into the ear at a vicinity of an opening of the ear; and
    a position adjusting mechanism that holds the speaker, attachably to and detachably from the temple, and movably at least substantially along a surface of the temporal region of the head, wherein the position adjusting mechanism includes a ball-hinge movable along the recession.

2. An image display apparatus that is mounted on a head or face of a wearer attachably and detachably and allows the wearer to view an image and hear sound, comprising:
    a long formed temple that is supported by a temporal region of head or an ear when the wearer is wearing the image display apparatus, wherein a plurality of recessions are formed on a side face of the temple opposite to a side face in contact with the temporal region of the head;
    a speaker that generates sound; and
    a ball-hinge that supports the speaker, wherein the ball-hinge is supported by any one of the plurality of recessions.

3. The image display apparatus of claim 2, wherein the speaker support member supports the speaker attachably and detachably, and a sound generating face of the speaker is insertable into the ear at a vicinity of an opening of the ear.

4. The image display apparatus of claim 2, wherein any one of the plurality of recession supports the ball-hinge attachably and detachably.

5. The image display apparatus of claim 2, further comprising:
    a display section that displays an image; and
    a light guide unit structure that guides the image displayed on the display section to a pupil of the wearer.

6. An image display apparatus that is mounted on a head or face of a wearer attachably and detachably and allows the wearer to view an image and hear sound, comprising:
    a long formed temple that is supported by a temporal region of head or an ear when the wearer is wearing the image display apparatus, wherein a recession is formed on a side face of the temple opposite to a side face in contact with the temporal region of the head;
    a speaker that generates sound; and
    a ball-hinge that supports the speaker, wherein the ball-hinge is supported by the recession movably along the recession.

7. The image display apparatus of claim 6, wherein the speaker support member supports the speaker attachably and detachably, and a sound generating face of the speaker is insertable into the ear at a vicinity of an opening of the ear.

8. The image display apparatus of claim 6, wherein the recession supports the ball-hinge attachably and detachably.

9. The image display apparatus of claim 6, further comprising:
    a display section that displays an image; and
    a light guide structure that guides the image displayed on the display section to a pupil of the wearer.

10. The image display apparatus of claim 9, wherein the light guide structure comprises a holographic optical element (HOE).

11. The image display apparatus of claim 7, wherein the speaker is formed in shape of a diameter of more than or equal to 5 mm but less than or equal to 15 mm in a direction perpendicular to the sound generating surface and in a range of at least 5 mm toward a direction opposite to a sound generating direction.

12. The image display apparatus of claim 7, wherein the speaker comprises a grip section configured to support the speaker at a position at least 5 mm toward the outside of the ear from the sound generating surface in a state in which the sound generating surface is inserted into the ear at the vicinity of the opening of the ear.

* * * * *